(12) United States Patent
Förster

(10) Patent No.: US 10,228,040 B2
(45) Date of Patent: Mar. 12, 2019

(54) VIBRATION DAMPER AND MOTOR VEHICLE

(71) Applicant: ZF FRIEDRICHSHAFEN AG, Friedrichshafen (DE)

(72) Inventor: Andreas Förster, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/118,054

(22) PCT Filed: Jan. 20, 2015

(86) PCT No.: PCT/EP2015/050995
§ 371 (c)(1),
(2) Date: Aug. 10, 2016

(87) PCT Pub. No.: WO2015/124346
PCT Pub. Date: Aug. 27, 2015

(65) Prior Publication Data
US 2017/0009842 A1    Jan. 12, 2017

(30) Foreign Application Priority Data
Feb. 21, 2014   (DE) .......................... 10 2014 203 181

(51) Int. Cl.
*F16F 9/18*    (2006.01)
*F16F 9/34*    (2006.01)
(Continued)

(52) U.S. Cl.
CPC ............ *F16F 9/5126* (2013.01); *F16F 9/185* (2013.01); *F16F 9/34* (2013.01); *B60G 13/08* (2013.01); *F16F 2228/066* (2013.01)

(58) Field of Classification Search
CPC .. F16F 9/5126; F16F 9/185; F16F 9/34; F16F 9/22; F16F 9/504; F16F 9/3221;
(Continued)

(56) References Cited

U.S. PATENT DOCUMENTS 2,500,708 A * 3/1950 Rossman ................ F16F 9/185
188/315
4,396,098 A * 8/1983 Petrak ..................... F16F 9/512
188/280
(Continued)

FOREIGN PATENT DOCUMENTS

DE      34 34 877       4/1986
DE     102004054474     6/2006
(Continued)

*Primary Examiner* — Robert A. Siconolfi
*Assistant Examiner* — San M Aung
(74) *Attorney, Agent, or Firm* — Cozen O'Connor

(57) ABSTRACT

A vibration damper with at least with at least two tube elements that are arranged one inside the other and a piston rod that is movable in a piston rod guide. A valve having a valve slide for at least partially closing at least one flow path of a fluid flowing through the valve is arranged in a region of one end of the piston rod guide. The valve has an input side and an output side. Pressure impingement areas of the valve slide are substantially the same size for an opening pressure and for a closing pressure, and the valve has a constriction via which a pressure difference between opening pressure and closing pressure can be generated.

20 Claims, 6 Drawing Sheets

(51) Int. Cl.
*B60G 13/08* (2006.01)
*F16F 9/512* (2006.01)

(58) Field of Classification Search
CPC ...... F16F 9/364; F16F 2228/066; F16F 9/512;
F16F 9/516; B62K 25/04; B62K 25/286;
B62K 2025/048; F16K 11/065; F16K
31/12; B60G 2202/413; B60G 17/016;
B60G 15/10; B60G 2400/60
USPC .......... 188/275, 266.2, 313; 137/625, 625.48
See application file for complete search history.

(56) References Cited

U.S. PATENT DOCUMENTS

| | | | |
|---|---|---|---|
| 4,749,068 A * | 6/1988 | Sirven ................... | F16F 9/512 |
| | | | 188/269 |
| 2007/0080515 A1* | 4/2007 | McAndrews .......... | B62K 25/04 |
| | | | 280/276 |
| 2014/0339033 A1* | 11/2014 | Lee ...................... | F16F 9/5126 |
| | | | 188/313 |

FOREIGN PATENT DOCUMENTS

| | | |
|---|---|---|
| DE | 10 2005 048949 | 12/2006 |
| EP | 2 163 784 | 3/2010 |
| WO | WO 2006/037816 | 4/2006 |

* cited by examiner

VIBRATION DAMPER AND MOTOR VEHICLE

CROSS REFERENCE TO RELATED APPLICATIONS

This is a U.S. national stage of application No. PCT/EP2015/050995, filed on Jan. 20, 2015. Priority is claimed on German Application No. DE10 2014 203 181.8, filed Feb. 21, 2014, the content of which is incorporated here by reference.

BACKGROUND OF THE INVENTION

1. Field of the Invention

The invention is directed to a vibration damper with at least two tube elements arranged one inside the other and a piston rod that is movable in a piston rod guide, wherein a valve comprising a valve slide for at least partially closing at least one flow path of a fluid flowing through the valve is arranged in the region of the one end of the piston rod guide, and the valve has an input side and an output side.

2. Description of the Prior Art

It is known to use valves in vibration dampers. In twin-tube vibration dampers, there is usually a base valve at the bottom of the working cylinder. Further, the piston can have a piston valve. In this case, the valves are compression valves.

It is further known, e.g., from DE 34 34 877 A1, to provide twin-tube dampers with an adjustable damping force in that a damping force generating device outside of the twin-tube damper is fluidically connected to the interior of the twin-tube damper. The resistance to the fluid can be adjusted at this damping valve to control the damping force of the vibration damper.

In order to produce damping valves of this type more economically it is necessary to limit the volume flow through the damping valve. Of course, flow valves for influencing the flow of a fluid are already known. In particular, there are two-way flow control valves, three-way flow control valves, or flow-dividing valves. But known flow valves cannot be utilized for the specified application in a vibration damper because they are either electrically operated or, by reason of their manner of operation, cannot be controlled purely as a function of volume flow.

In a vibration damper with adjustable damping force known from DE 102004054474 B3, there is arranged upstream of an adjustable damping valve an additional damping valve. In this way, maximum pressures that occur suddenly, for example when driving over a bump, can be contained and kept away from the adjustable damping valve.

SUMMARY OF THE INVENTION

It is an object of the present application to provide a valve for the piston rod-side end of a vibration damper that can be operated passively, i.e., mechanically or hydraulically, and controlled substantially depending on volume flow and, therefore, independent of pressure so that a device that is connected to the vibration damper such as a damping valve can be operated with a maximum volume flow.

The pressure impingement areas of the valve slide are substantially the same size for an opening pressure and for a closing pressure, and the valve slide has a constriction via which a pressure difference between opening pressure and closing pressure can be generated.

In this regard, the opening pressure moves the valve slide out of the normal position in the direction of the overload position, while the closing pressure propels the valve slide in the opposite direction. Accordingly, the opening pressure impinges on surfaces that face the input side and the closing pressure impinges on surfaces that face the output side. Input side and output side refer to the regions inside and outside of the valve slide which are above and below the constriction or, when installed horizontally, lateral to the constriction. Those areas that are arranged facing the piston as viewed from the constriction after the valve have been installed in a vibration damper and are located on the input side and those areas that are correspondingly arranged remote of the piston are located on the output side. In this regard, it is assumed that the vibration damper is in rebound and the fluid of the vibration damper accordingly has a defmite flow direction.

Accordingly, the pressure impingement areas are those cross-sectional areas diametrical to the constriction as projection on the cross-sectional area in direction of the longitudinal axis or movement direction of the valve slide. The pressure impingement areas must be substantially equal in size, i.e., the projected surfaces contain the same, or only slightly different, surface area. In particular, this does not mean that the valve slide must be constructed symmetrically above and below or lateral to the constriction; rather, the inner walls can be shaped differently on the input side and output side. Further, the pressure impingement areas can also be constructed of a plurality of parts. Also, no other kinds of symmetries are necessary in axial direction; the valve slide is preferably formed so as to be rotationally symmetrical. A uniform pressure distribution and pressure impingement can be achieved in this way.

Further, it is preferably provided that the valve slide has a hollow-cylindrical basic shape. By this it is meant that the valve slide separates an interior space from an exterior space. It is not necessary that the inner wall or walls or the outer wall have any particular shape. In particular, the walls need not be "smooth"; they can also be stepped. However, it is preferably provided that there is a continuous cross-sectional reduction toward the constriction, specifically from both the input side and output side, so as not to cause flow separation. Accordingly, the thickness of the wall varies in axial direction.

The pressure impingement areas preferably occupy less than one half and more than one fourth of the total cross-sectional area of the valve slide. In a particularly preferred manner, the pressure impingement areas occupy more than one third of the total cross-sectional area of the valve slide and, more preferably, more than 40 percent of the total cross-sectional area of the valve slide.

The valve is preferably arranged radially around the piston rod. The end of the piston rod guide at which the valve is arranged is the end facing the tubular part of the vibration damper. In other words, the end facing the inner tube element.

The flow path within the valve is preferably substantially hollow-cylindrical. While the constriction, as narrowing, changes the width, the hollow-cylindrical shape persists.

In an advantageous manner, at least one channel connects the interior of the valve to an intermediate space so that the pressure of the fluid is taken off at the level of the channel.

The pressure ratios under fluid flow are as follows: on the input side, the opening pressure $p1$ is present on the entire surface. The diameter increases toward the constriction so that the flow cross section decreases, which is why the flow velocity increases toward the constriction, while the pressure decreases. After passing the constriction, however, the flow velocity of the fluid decreases again and the pressure increases until the other end of the valve slide is reached. Pressure that is lower than the opening pressure p1 is taken off through the channel so that the intermediate space within the valve slide also has this pressure level.

The channel can preferably connect the interior of the valve to an annular space inside the valve slide, particularly an annular space accommodating a spring. The annular space is enclosed by the valve slide on the one hand and by the valve housing on the other hand. Accordingly, there is a uniform pressure level around the valve slide.

In a particularly advantageous manner, the at least one channel is arranged in the region of the constriction. In this case, the pressure at the constriction and, therefore, the lowest pressure within the valve slide is taken off.

In a particularly preferable manner, the valve slide has at the input side a circumferential projection that guides the valve slide in a housing and limits an annular space in the valve slide on one side. Accordingly, the projection extends radially inside the valve slide. Also, a portion of the housing is arranged inside the valve slide. In this case, the opening cross section of the interior space of the valve is preferably larger on the input side than on the output side. This difference in cross section is occupied substantially by the circumferential projection. Accordingly, the pressure impingement area for the closing pressure is divided in two. Different pressures then also act on the different pressure impingement areas. Both pressures p2 and p6, which act as closing pressure, are smaller than the opening pressure p1 because the latter is present at the location of the largest cross section and, therefore, at the location of the greatest pressure as well as the lowest velocity.

In this way, the pressure difference generated by the constriction between the opening pressure and closing pressure can be increased and the stability of the opening process and closing process can be improved.

The cross-sectional surface of the channel or channels is preferably larger, particularly at least five times larger, preferably at least ten times larger, than the leakage area located between the circumferential projection of the valve slide and the valve housing. The leakage area cannot be avoided; there is always a slight tolerance in the positive engagement. The difference in surface area between the channels and the leakage ensures that the measured internal pressure of the valve, particularly the pressure at the constriction and not an undefined pressure, is present in the annular space.

Accordingly, under fluid flow the closing pressure, i.e., the pressures that move the valve slide in the normal position, is always less than the opening pressure, but the pressure impingement areas are identical. Therefore, the valve is dependent on the volume flow.

The pressure difference that can be generated between opening pressure and closing pressure through the constriction first takes place, of course, when a fluid is flowing. Without movement of the fluid, there is no pressure difference between the input side and output side of the valve.

The valve preferably has one individual constriction for generating a pressure difference between opening pressure and closing pressure. Therefore, this constriction is preferably arranged in the central region of the valve. Preferably, the constriction is provided between a top fourth and a bottom fourth of the valve slide.

In a particularly advantageous manner, the constriction is formed by an enlarged portion of the valve slide facing radially outward. The outer wall of the valve slide can be thicker toward the constriction in a continuous or stepped manner.

In an advantageous manner, the valve slide can be preloaded by an energy storage, particularly a spring. The valve slide of the valve which is controlled as a function of volume flow is displaceable in the valve housing. The valve slide must have a preferred position so that the valve slide has a fixed initial position, i.e., the valve slide is always to be found in a definite position when put into operation. This preferred position can be predefined by the energy storage. The force exerted by the energy storage should be at least sufficient to fix the valve slide in the preferred position against friction and, depending on the installed position, also against its own weight force. The preloading force of the energy storage can also be used to affect how large the volume flow must be to move the valve slide out of the normal operating position. The energy storage is preferably supported against the valve housing. The valve housing can be formed of one, two, or more parts. The spring is preloaded between the valve slide and that part of the valve housing that is remote of the preferred position insofar as a compression spring is concerned or on the side of the preferred position when a tension spring is used. Of course, these considerations also apply to other types of energy storages. What is crucial is whether the energy storage exerts a tensioning force or a compressing force.

Advantageously, the piston rod guide and/or the inner tube element can form a part of the valve housing or can support a portion of the valve housing.

The preferred position of the valve slide is the normal operating position of the valve. Since the opening pressure and the closing pressure on the pressure-impinged areas substantially compensate for one another in normal operation, i.e., in the normal operating position of the valve slide, the valve slide remains in the preferred position until the volume flow through the valve slide exceeds a threshold value so that the differential pressure between the input side and the output side, and possibly between the input side and annular space, pushes the valve slide out of the normal operating position and moves it in the direction of the overload position. In principle, the valve slide is selectively displaceable between the normal operating position and the overload position.

The constriction is advantageously formed as a circular narrowing. Accordingly, the outer diameter of the valve slide widens at a certain axial height, this widened outer diameter comprising a predefined, contiguous portion. In principle, the widening can be formed in a stepped manner, but the valve slide is preferably formed so as to proceed to termination in a conical manner toward the constriction on the input side. Following the constriction, the outer diameter preferably likewise decreases uniformly.

It should be mentioned that the constriction need not be formed as a narrowing. For example, the constriction can also be realized in that a plate with bores is located in the valve. However, this variant has the disadvantage that the volume flow is impeded no matter what the volume in the flow, and production is more elaborate compared to the previously described embodiment.

The valve slide can preferably have a larger flow area at the output side in a first operating position, particularly a normal operating position, and a smaller flow area in a second operating position, particularly an overload position. In this way, the flow resistance of the fluid can be controlled. With a larger flow area, the fluid encounters less resistance and can accordingly flow unimpeded. Decreasing the flow area in the overload position increases the flow resistance.

The walls of the valve slide on the output side can preferably have at least one recess. This recess which goes through the entire wall ensures that even in the overload position an opening through which the fluid can flow always remains open. In this way, at least one volume flow which is set by the size of the recess is always admitted to the damping valve. The recess can be provided in the manner of a notch or slit at the underside of the wall of the valve slide, but can also be inserted in the wall of the valve slide in the manner of a window so that the valve slide is closed at the lower edge. Ultimately, the position of the recess depends inter alia on the flow path of the fluid.

In an advantageous manner, the valve slide has at least two recesses, and these recesses are arranged symmetrically. With a symmetrical arrangement of the recesses, the valve slide—and therefore the valve—is more balanced with respect to pressure compared to an asymmetrical arrangement, which is why a symmetrical arrangement is preferred. Depending on the size and arrangement of the recesses, a quantity of six to eight recesses is particularly advantageous.

Alternatively, the described widening of the valve slide at the constriction can be used to limit the volume flow in the main flow path. Consequently, a displacement of the valve slide causes a cross-sectional narrowing of the flow path. A projection is preferably provided inside the valve housing or inside the flow path for this purpose.

The valve slide can preferably have at least one stop that limits the relative movement with respect to the valve housing. It is then possible, regardless of the presence of recesses at the output side, to always leave an opening for the fluid in the overload position on the output side. The opening cross section on the output side can also be maintained in its entirety regardless of the position of the valve slide.

Preferably, a main flow path which can be closed by the valve slide can be fluidically connected as flow path with the output side of the valve; that is, the main flow path is considered to be that path that follows the valve and valve slide on the output side. Therefore, the above-described preferred position for the valve slide, and, therefore, also the normal operating position, is a positioning of the valve slide remote of the output side; accordingly, an energy storage for preloading the valve slide is to be supported between an input-side portion of the valve slide and an output-side portion of the valve housing insofar as the energy storage is compressive. In case of a tensile energy storage such as a tension spring, however, this energy storage would be arranged between an output-side portion of the valve slide and an output-side portion of the valve housing.

The main flow path can preferably lead at least partially through the inner tube element and the center tube element. Irrespective of this configuration, the main flow path can lie partially between the valve slide and the valve housing.

In an advantageous manner, a bypass path, which can be closed by the valve slide, can be fluidically connected as a flow path in the input side of the valve. Instead of a bypass path, a pressure limiting valve, for example, could also be provided in the piston so that the fluid is conducted through the piston when a valve is in the overload position and, therefore, as pressure rises. However, a pressure limiting valve in the piston assumes that a higher pressure can be built up. Since the existing pressure and the volume flow are linked, the value that is accordingly predetermined through the damping force generating device via the volume flow is so small that the pressure limiting valve must already operate in a pressure range in which it should actually not yet be operative. The bypass path accordingly offers the advantage that on the one hand the piston can be constructed in a simplified manner and on the other hand it is accordingly possible to divert merely the surplus portion of the volume flow without the need for any changes to take place above the valve.

In an advantageous manner, the bypass path can lead at least partially through the center tube element and the outer tube element. Irrespective of this configuration, the bypass path can lead partially inside the valve slide and/or valve housing. The bypass path then lies between the valve slide and piston rod guide and/or valve housing and piston rod guide. The part of the piston rod guide used for this purpose is a tension stop housing.

In particular, the valve slide can also be displaceable such that it merely opens and closes the bypass path depending on the volume flow flowing through the valve slide and leaves the main flow path unchanged. For this purpose, the valve slide in the overload position can be supported at a stop on the output side, and the flow area of the main flow path is not reduced or is not substantially reduced. This is also achieved when the valve slide is supported by feet on the base of the main flow path insofar as the cross section of the latter reduces the flow area only negligibly.

Preferably, the valve slide can have at least one guide. The guide can be constructed, for example, as a kind of inner ring on the inner side of the valve slide. The guide is preferably positioned on the input side of the valve slide. In this case, the valve slide has one individual guide. But it is also possible, of course, to provide as a guide, for example, a plurality of projections which are guided in guide grooves. A space is to be provided over the guide, since the guide is raised and lowered when the valve slide moves from the normal operating position into the overload position and back again and a corresponding movement space is to be provided for this purpose. This space can also be adjoined, for example, by the space for accommodating the energy storage provided the normal operating position lies toward the input side and the energy storage is a compression spring.

Advantageously, a pressure limiting valve can be arranged in the bypass path. This pressure limiting valve is preferably constructed as a check valve is preloaded in the closing direction. Accordingly, the bypass path also has a certain flow resistance so that not all of the fluid volume flows off via the bypass path when the valve slide moves into the overload position and only a vanishingly small portion still remains on the main flow path. Rather, a constant, maximum required volume or maximum volume flow continues to flow through the recesses at the output side of the valve slide. In this embodiment, the valve is a seat valve with downstream valve in the bypass path.

Preferably, the vibration damper can have three tube elements arranged one inside the other, and a displaceable piston is arranged in the innermost tube element, the valve is arranged in or at the innermost tube element, and the center tube element separates a main flow path from a bypass path, which are fluidically connected to the interior of the innermost tube element. As was explained in the beginning, the valve, which has been described at length above, is provided in a vibration damper, but the specific construction of this vibration damper does not depend on the construction of the valve. The constructional composition of the vibration damper is arrived at in that the vibration damper comprises three tube elements in coaxial arrangement with respect to one another. The construction is similar to a twin-tube damper with intermediate tube, but there is no gas in the exterior space of the present vibration damper so that this space does not represent a compensation space. Further, the central volume and outer volume are preferably connected to the working space, i.e., the space in the inner tube element, such that the fluid flowing in the main flow path and in the bypass path can be returned again to the working space, specifically above the piston, The compensation space can be arranged lateral to or below the tube elements, but can also be part of the three tube elements.

A damping force generating device can preferably be arranged in the main flow path. As was described above, this damping force generating device must be protected against excessively large volume flows, which is achieved by the valve.

The invention is also directed to a motor vehicle comprising a vibration damper such as that described.

BRIEF DESCRIPTION OF THE DRAWINGS

Further embodiments, details and features are indicated in the embodiment examples and figures described in the following. In the drawings.

DETAILED DESCRIPTION OF THE PRESENTLY PREFERRED EMBODIMENTS

Figure 1:
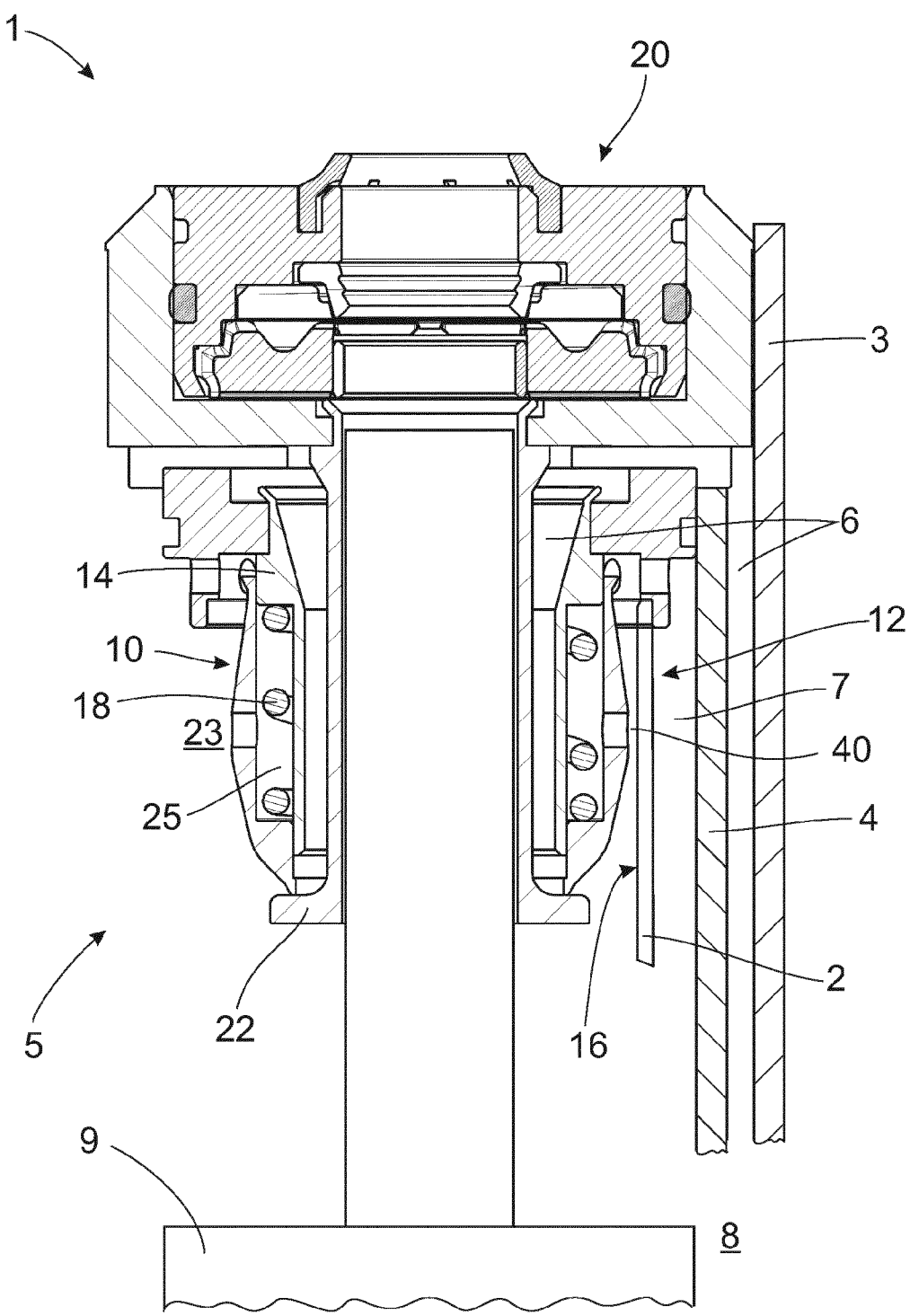
FIG. 1 is a configuration of a vibration damper.

FIG. 1 shows a portion of a vibration damper 1 with an inner tube element 2, an outer tube element 3, a center tube element 4, which is arranged between the inner tube element 2, and outer tube element 3, and a valve 5. For the sake of clarity, the inner tube element 2, the center tube element 4 and the outer tube element 3 are only shown on one side in FIG. 1 and are not shown at all in the rest of the figures. A bypass path 6 is located between the center tube element 4 and the outer tube element 3, and a main flow path 7 is located between the inner tube element 2 and the center tube element 4. A damping force generating device, e.g., a damper valve 8, which is to be protected against excessively large volume flows, is located in the main flow path 7 and is arranged at the end of the vibration damper remote of the piston rod. A piston 9 which either works as a simple displacer or which has a compression valve that opens under very high pressures is provided in the inner tube element 2. The valve 5 substantially comprises a valve slide 10, a valve housing 12 comprising housing parts 14 and 16, and a spring 18. There are two channels 21, shown in FIG. 2, between the exterior space 23 of the valve slide 10 and an interior space 25.

The piston rod guide is known per se. The tension stop 22 is moved inward such that it can support the valve 5.

Figure 2:
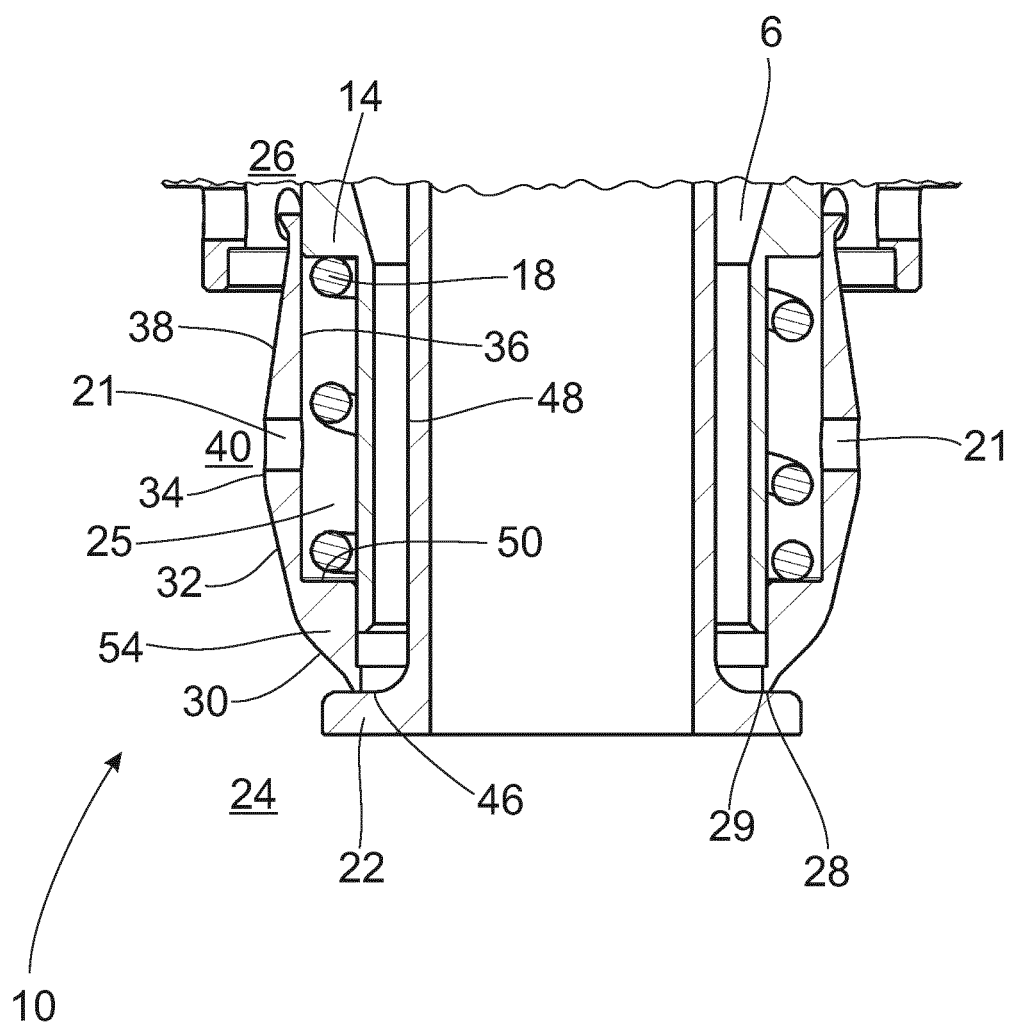
FIG. 2 is a valve slide.

FIG. 2 shows the valve slide 10 in more detail. The valve slide 10 has an input side 24 on the piston side and an output side 26 remote of the piston 9. The terms "piston side" and "remote of the piston" refer to the valve 5 in its installed state in a vibration damper 1. In the following, the valve slide 10 will be described from the input side 24 toward the output side 26. The underside of the valve slide 10 is formed by surface 28. Surface 28 is on a narrow annular projection that passes into the circumferential projection 54. Accordingly, surface 28 is the valve surface of valve 5, which is constructed as a seat valve and located opposite the valve seat surface 29, formed at the tension stop 22. Toward the inside, surfaces 30 and 32 form a conically narrowing funnel that opens into the side surface 34. Surface 38 follows the side surface 34 extending parallel to the outer side 36. Surface 38 has the same slope or a similar slope relative to side surface 34 as surface 32; that is, the inner diameter widens toward constriction 40 on the output side 26 to the extent that it decreases on the input side 24 in front of the constriction 40. This continuous narrowing and widening is intended to prevent flow separations.

Owing to the shape of the valve slide 10, the interior space 25 includes a part of the space radially inside of the valve slide 10. In any case, the exterior space 23 contacts the input side 24 and output side 26, which is why there is no reason for a channel connecting these spaces.

There are two radially extending channels 21 in the region of the constriction 40. These channels 21 are configured as through-openings and connect the exterior space 23 of the valve slide to the interior space 25, in this case, the space that receives the spring 18. Instead of two channels 21, one or three or more channels 21 can also be provided. Channels 21 are preferably distributed symmetrically in circumferential direction. This quantity and symmetry of the channels 21 is not limited to the embodiment form described, but rather applies in general. The channels 21 need not lead perpendicularly through the wall of the valve slide, although that is a preferred configuration.

FIG. 2 shows the following characteristics for pressure-balancing the valve 5.

The inner edge 46 on the input side 24 of the valve slide 10 lies in a (longitudinal) plane with the inner side 48. This is the same plane in which the projection 54 terminates inwardly. Accordingly, the surfaces impinged by the opening pressure p1 and the closing pressure p2 and p6 are the same size (see FIG. 5). The pressure impingement areas can be determined through a projection of the cross section on a plane perpendicular to the longitudinal axis or movement direction of the valve slide 10. In other words, as long as the inner diameter and outer diameter of the pressure impingement areas are equal, they are impinged equally with the same opening pressure p1 and closing pressure p2 and p6 regardless of the slope of surfaces 30, 32 and 38. In this embodiment of the valve slide 10, however, a pressure difference is produced by the volume flow flowing through the valve slide 10. This results in the following manner:

The resulting force on the slide F equals the difference between the opening pressure p1 and the closing pressure p2 and p6, which are multiplied, respectively, by the pressure-impinged area. The pressure impingement area a1 for the opening pressure p1 can be determined by the diameter of the valve slide 10 on one side at the height of surface 28 at inner edge 46 (diameter dsf) and at the height of side surface 34 (diameter dsi). In other words, the diameters at the valve surface, in this case the inner diameter of surface 28, and at the constriction 40 are to be used to calculate area a1. Using simple geometric circle calculations, area a1 is accordingly equal to the difference between a larger-area circle at the height of surface 28 and a smaller circle at the height of side surface 34. Basically equal diameters are used in calculating pressure impingement area a2 of closing pressure p2 so that areas a1 and a2 are equal. This results as follows: to calculate the pressure-impinged area a2 during closing pressure p2 and p6, diameter dsi at constriction 40 is used on the one hand as for the opening pressure p1, and the diameter defined by the outer side 48 is used on the other hand. The pressure-impinged area a2 for the closing pressure is accordingly given by the pressure on surface 38 and on surface 50. Accordingly, area a2 is comprised of areas a21 and a22. These annular areas transition smoothly one into the other because they have inner side 36 as transition point. Accordingly, however, diameters that are exactly equal to those used for calculating pressure impingement area a1 enter into the calculation of pressure impingement area a2. Therefore, a pressure difference results only by reason of the volume flow of the moving fluid, and this pressure difference depends on the diameter or cross-sectional area a4 of the constriction 40.

Constriction 40 causes a pressure difference in a twofold manner. On the one hand, it causes a pressure drop, and the pressure p5 measured there as pressure p6 on surface 50 impinges on a portion of the pressure impingement area a2. Further, the outer diameter of the valve slide 10 no longer decreases to the initial size and, for this reason, pressure p2 is always less than opening pressure p1. In addition, a portion of the movement energy of the flowing fluid dissipates to heat owing to constriction 40 so that there is also a pressure drop between the opening pressure p1 and pressure p2. These three operative mechanisms for generating a pressure difference between the opening pressure p1 and the closing pressures p2 and p6 are advantageously cumulative.

There is also always a difference between the opening pressure p1 and closing pressure p6 due to heat dissipation. Even if it is assumed that the closing pressure p2 and opening pressure p1 which act on area a21 and the corresponding portion of area a1 are also equal with flowing fluid, there still remains the difference between pressures p6 and p1 on area a22 and the corresponding portion of a1. This difference is sufficient by itself to control the valve 5 purely as a function of volume flow.

The diameter dka of channels 21 is dimensioned such that the pressure p6 acting on surface 50 corresponds completely or at least substantially to pressure p5 at constriction 40. To this end, the cross-sectional area of all of the channels 21 must be a multiple of the leakage area between the tension stop housing and housing part 16. In particular, the cross-sectional area of channels 21 is five times, preferably ten times, and particularly preferably fifteen times, as large as the leakage area of the interior space 25 in the valve slide 10. In particular, the diameter dka of channels 21 is between one and five millimeters, preferably between two and four millimeters, and particularly preferably between 2.5 and three millimeters. This applies to all of the embodiments independent from other features particularly of the valve slide, valve housing and valve.

On the output side 26, the valve slide 10 has a plurality of recesses. These recesses can be passages from the underside of the valve slide 10, as is shown here, but can also be arranged as a type of window at some distance from the underside so that the valve slide 10 is closed on the underside. Of course, the recesses extend through the wall of the valve slide so that there is always a minimum volume flow even in the overload position. Valve slide 10 is arranged in the normal operating position in FIG. 1 and in FIG. 2. This preferred position results from the preloading by spring 18. In the embodiment form according to FIGS. 1 and 2, the normal operating position is characterized in that the valve surface, i.e., surface 28, is pressed against the opposite surface, namely, the valve seat surface 29. The bypass path 6 is closed in this position.

On the input side 24, the valve slide 10 has an annular projection 54. There is also a certain hollow space located above this annular projection 54 as a result of the lift path of the projection 54 during the movement of the valve slide 10 when the spring 18 is not provided. When the spring 18 is arranged between projection 54 and valve housing 16, this hollow space is larger on the inner side 36 of the valve slide 10.

An oil reservoir 68 is provided below the elastically deformable disk 58.

Figure 3:
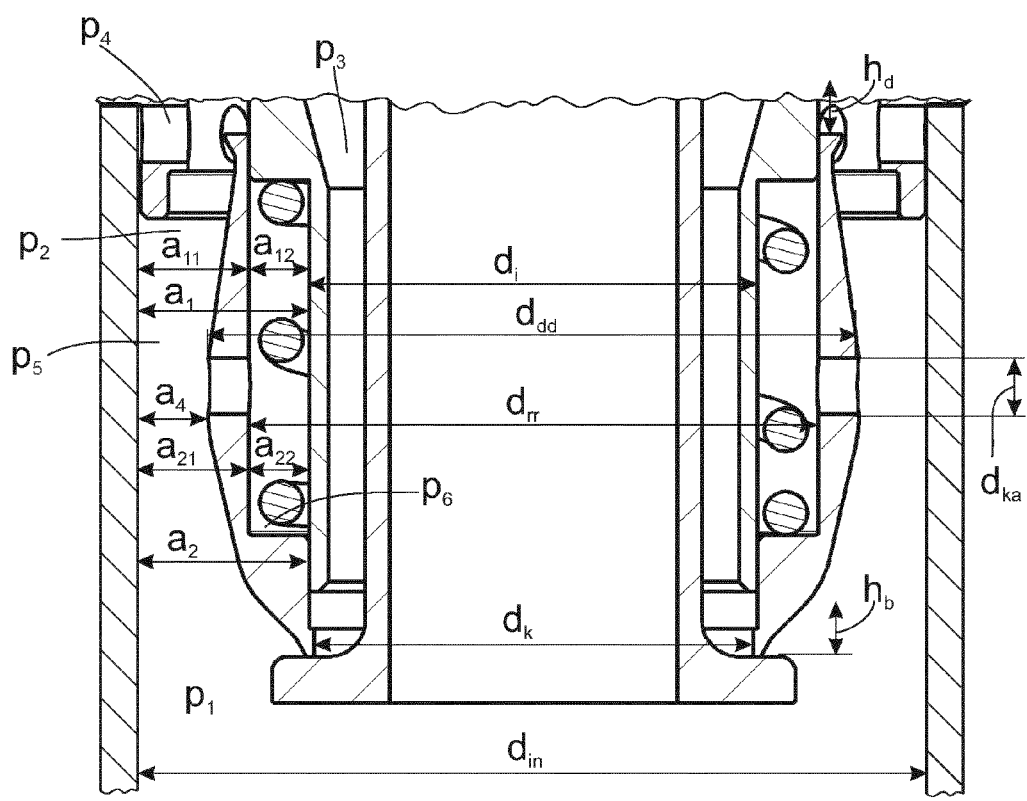
FIG. 3 is a diagram showing the dimensions of a valve slide.

To illustrate the dimensions mentioned with reference to FIG. 2, FIG. 3 shows these dimensions separately from FIG. 2 for the sake of clarity. The indicated diameters have reference characters starting with a "d", while areas are denoted by "a". Of course, the surfaces extending perpendicular to the drawing plane are not depicted as such. The following dimensions are shown:

di inner dimeter of annular space, and
drr outer diameter of annular space.

The vibration damper 1 in which the valve 5 can be installed presents an inner tube diameter din. The next diameter shown is the diameter dk along edge 46. Diameter dd at constriction 40, diameter drr of the annular space and the inner diameter di of the annular space are also shown. Both pressure impingement area a1 and pressure impingement area a2 can be calculated via the latter:

$$a1 = \pi \cdot \left(\frac{dd}{2}\right)^2 - \pi \cdot \left(\frac{dk}{2}\right)^2$$

$$a2 = \pi \cdot \left(\frac{dd}{2}\right)^2 - \pi \cdot \left(\frac{di}{2}\right)^2$$

$$a4 = \pi \cdot \left(\frac{din}{2}\right)^2 - \pi \cdot \left(\frac{dd}{2}\right)^2$$

It should be noted that the first part of the formulas for calculating a1 and a2 correspond because the diameter dk along the inner edge of surface 28 for calculating a1 and the diameter di at surface 50 for calculating a2 are equal by reason of the structural design of the valve slide 10.

The pressure impingement area a2 is formed of partial areas a21 and a22. Using diameter drr:

$$a21 = \pi \cdot \left(\frac{dd}{2}\right)^2 - \pi \cdot \left(\frac{drr}{2}\right)^2$$

and $$a22 = \pi \cdot \left(\frac{drr}{2}\right)^2 - \pi \cdot \left(\frac{di}{2}\right)^2$$

As can easily be seen, pressure impingement areas a21 and a22 sum to a2. Analogously, pressure impingement area a1 can be divided conceptually into corresponding pressure impingement areas a11 and a12. The formulas correspond to those for a21 and a22. A pressure difference between opening pressure and closing pressure can then also be generated in the following manner.

Closing pressure p6 acts on pressure impingement area a22, and closing pressure p1 acts on pressure impingement area a12. With flowing fluid, the pressure in the valve slide at the constriction 40 is lowest; the faster the fluid flows, the greater the pressure difference. This is known as the Venturi effect and can be calculated using Bernoulli's equation. When a threshold value is exceeded, the preloading force of spring 18 is overcome and the bypass path 6 is opened.

In addition, a pressure difference can occur between the input side 24 and output side 26 through the constriction 40. This difference between pressures p1 and p2 acts on pressure impingement areas a11 and a21 and increases the force acting on the valve slide.

Figure 4:
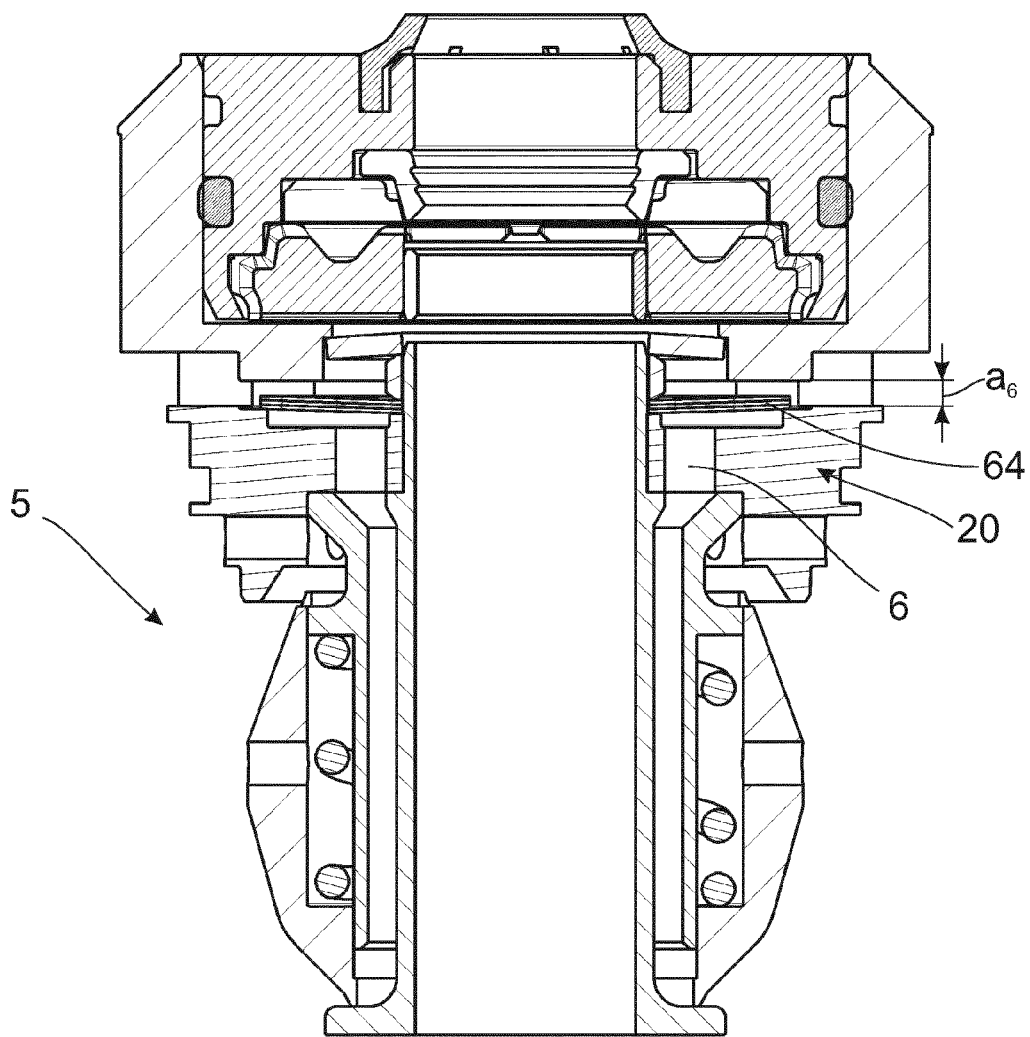
FIG. 4 is a configuration of a vibration damper.

FIG. 4 further shows the distance hb of surface 28 from valve seat surface 29, and the distance hd from the surface of the valve slide 10 to the top of the main flow path 7. Distance hb represents the height of the opening of the bypass path 6 and distance hd shows the height of the outlet area a31.

Outlet area a31 is an annular area which is the product of a circumference and a height. The circumference depends on the diameter drr defined by the inner edge; the height is, as was described above, the distance hd from surface 52 to the base of the main flow path 7. In the overload position, distance hd is equal to zero, and it reaches its maximum value in the normal operating position. Accordingly, the outlet area a31 can also vary from zero to a maximum value:

$$a31 = 2 \cdot \pi \cdot \frac{drr}{2} \cdot hd.$$

Outlet area a32 designates the area defined by all of the recesses 53. Outlet area a32 is that area in the main flow path 7 that is always open for producing a minimum flow. The total cross-sectional area a3 is equal to the sum of areas a31 and a32.

The outlet area a5 of the bypass path 6 is also an annular area. The circumference which must therefore be determined is equal to the inner diameter dk and the height is equal to distance hb:

$$a5 = 2 \cdot \pi \cdot \frac{dk}{2} \cdot hb.$$

Like distance hd, distance hb can vary from zero to a maximum value and, of course, the value of distance hb can be smaller if distance hb is larger.

$hb+hd$=const.

Of course, this only applies when the flow area at the output side 26 can be varied. On the other hand, in an embodiment in which only the bypass path 6 is opened and closed and the flow area of the main flow path 7 remains constant, the total cross-sectional area a3 is constant, in which case it need not be formed of a plurality of areas.

FIG. 4 shows a further embodiment form of the valve 5. The valve slide 10 is constructed as shown in FIGS. 1 to 3 except for the proportions, i.e., the diameters, compared to axial length. The key difference is the pressure limiting valve 20 in the bypass path 6. The pressure limiting valve 20 is formed as a check valve, which is preloaded in closing direction. Pressure limiting valve 20 includes at least one elastically deformable disk, two rings and a disk package 64. One ring is supported on the elastically deformable disk, the disk package 64 is fixed between the rings, which prevents an abrupt drop in pressure at the damping valve 8 in the main flow path 7 when the bypass path 6 is opened.

Like outlet areas a31 and a5, cross-sectional area a6 of pressure limiting valve 20 is an annular area. The height corresponds to the height of the gap opened by the disk package 64, which height can accordingly be varied between zero and a maximum value. The circumference for calculating cross-sectional area a6 is defined by support point 67. Support point 67 is, of course, only a point in cross section; in actuality, it is a support circle.

Figure 5:
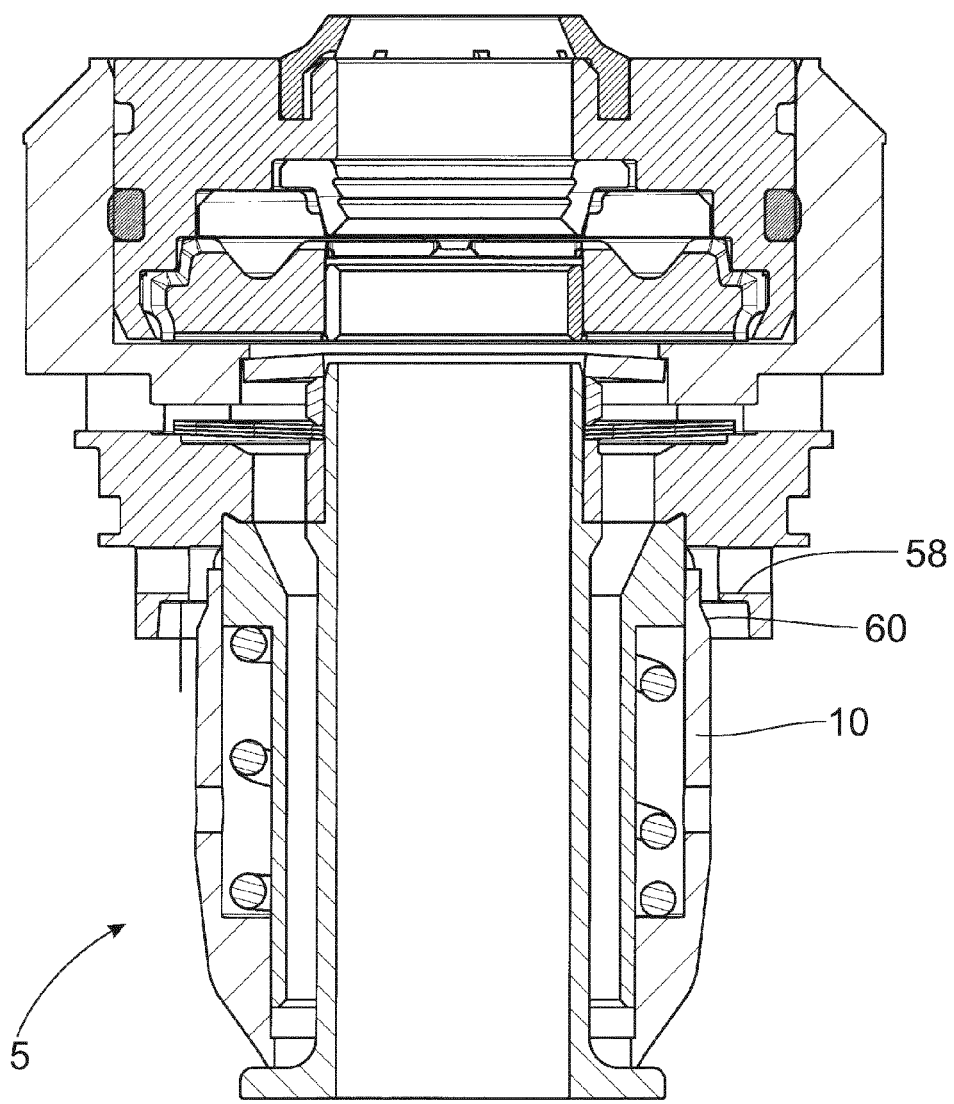
FIG. 5 is a configuration of a vibration damper.

FIG. 5 shows a further embodiment form of the vibration damper 1. In this embodiment form, the valve slide 10 cooperates with a projection 58 such that a displacement of the valve slide 10 results in a narrowing of the cross-sectional area of the main flow path 7 and, therefore, a limiting of the volume flow. To this end, the valve slide is provided with a larger outer diameter at the constriction 40 than on the output side 24. The diameter is narrowed particularly in a transition region 60. This transition region is moved in direction of the projection 58 during the movement of the valve slide 10 into the overload position and accordingly reduces the diameter of the main flow path.

Figure 6:
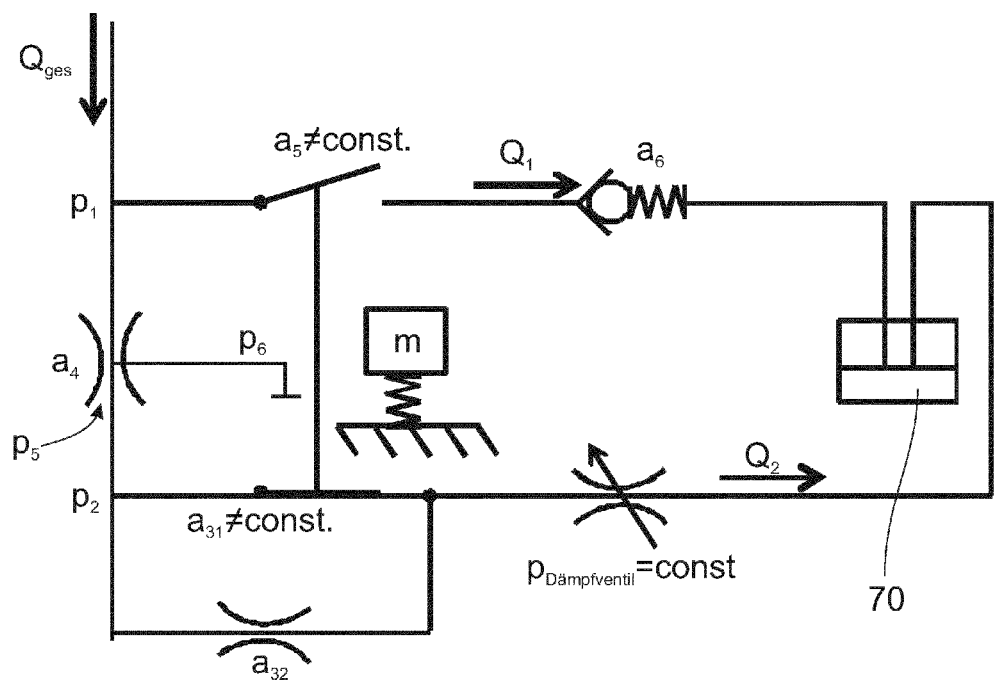
FIG. 6 is a hydraulic circuit diagram.

FIG. 6 shows a hydraulic schematic diagram of the valve according to FIG. 1. The dimensions shown in the drawing correspond to the dimensions that were used in the previous description of the figures. Owing to a piston movement, a total volume flow Qges is present on the input side 24 of valve 5. The constriction 40 with an area a4 lies between the opening pressure p1 and the closing pressure p2. Area a4 of constriction 40 is evident from inner diameter dsi. Following the constriction 40 in the flow path is total cross-sectional area a3, which is given by outlet area a31 and outlet area a32 in the normal operating position and only by outlet area a32 in the overload position. In the overload position, outlet area a31 is closed by the valve slide 10. Instead, outlet area a5, which connects the input side 24 and the bypass path 6, is open. Accordingly, at the output side 26 the valve slide 10 has a larger flow area in a first operating position, namely, the normal operating position, and a smaller flow area in a second operating position, namely, the overload position. Alternatively, as described referring to FIG. 5, area a3 can be variable and not composed of partial areas a31 and a32.

It further follows from FIG. 6 that the total volume flow Qges comprises partial volume flows Q1 and Q2. Q1 is the volume flow flowing in the bypass path 6 and Q2 is the volume flow flowing in the main flow path 7. In the normal operating position, total volume flow Qges and partial volume flow Q2 are identical, since the bypass path 6 is closed. Further, a compensation space 70 which is not shown in FIGS. 1 to 5 can be seen in FIG. 6. The compensation space 70 fluidically communicates with the interior volume of the inner tube element 2 and receives the fluid volume displaced by the piston rod. Oil is preferably used as fluid; however, the valve 5 may be operated with any incompressible fluid in principle.

The action of channels 21 is shown through the connection between the constriction 40 with connection line a5-a31: the channels 21 split the closing pressure p6 and accordingly increase the pressure difference between opening pressure p1 and pressures p2 and p6 acting in closing direction.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A vibration damper comprising:
   at least two tube elements which are arranged one inside the other;
   a piston rod guide;
   a piston rod which is movable in the piston rod guide; and
   a valve arranged in a region of one end of the piston rod guide and comprising:
   a valve slide configured to at least partially close at least one flow path of a fluid flowing through the valve;
   an input side;
   an output side;
   pressure impingement areas of the valve slide between the input side and the output side are substantially a same size for an opening pressure and for a closing pressure; and
   a constriction configured as a radially outward directed conically narrowing funnel having at least an input surface and an output surface between the input side and the output side via which a pressure difference between opening pressure and closing pressure can be generated,
   wherein the input surface is different than the output surface.

2. The vibration damper according to claim 1, wherein at least one channel connects an exterior space of the valve slide to an interior space so that a pressure of the fluid is taken off at a level of the at least one channel.

3. The vibration damper according to claim 2, wherein the at least one channel connects the interior of the valve to an annular space inside the valve slide configured as an annular spring accommodating space.

4. The vibration damper according to claim 2, wherein the at least one channel is arranged in a region of the constriction.

5. The vibration damper according to claim 1, wherein the constriction is formed as a circular narrowing.

6. The vibration damper according to claim 1, wherein the valve slide has at the input side a circumferential projection that guides the valve slide in a housing and limits an annular space in the valve slide.

7. The vibration damper according to claim 1, wherein a wall of the valve slide on the output side has at least one recess.

8. The vibration damper according to claim 7, wherein the valve slide has at least two symmetrically arranged recesses.

9. The vibration damper according to claim 1, wherein the at least one flow path comprises a main flow path fluidically connected as a flow path with an output side of the valve and that can be closed by the valve slide.

10. The vibration damper according to claim 9, wherein the main flow path leads at least partially through an inner tube element and a center tube element.

11. A vibration damper comprising: at least two tube elements which are arranged one inside the other;
    a piston rod guide;
    a piston rod which is movable in the piston rod guide; and
    a valve arranged in a region of one end of the piston rod guide and comprising:
    a valve slide configured to at least partially close at least one flow path of a fluid flowing through the valve;
    an input side;
    an output side;
    pressure impingement areas of the valve slide between the input side and the output side are substantially a same size for an opening pressure and for a closing pressure; and
    a constriction between the input side and the output side via which a pressure difference between opening pressure and closing pressure can be generated,
    wherein the at least one flow path comprises a bypass path that can be closed by the valve slide and is fluidically connected as a flow path with the input side of the valve.

12. The vibration damper according to claim 11, wherein the bypass path leads at least partially through a center tube element and an outer tube element.

13. The vibration damper according to claim 11, wherein a pressure limiting valve is arranged in the bypass path.

14. The vibration damper according to claim 13, wherein the pressure limiting valve is constructed as a check valve that is preloaded in a closing direction.

15. The vibration damper according to claim 1, wherein at least one of the piston rod guide and an inner tube element forms a part of a valve housing.

16. The vibration damper according to claim 1, wherein at least one of the piston rod guide and an inner tube element supports a part of a valve housing.

17. The vibration damper according to claim 1, wherein the valve slide is preloaded by an energy storage configured as a spring.

18. A vibration damper comprising:
    at least two tube elements which are arranged one inside the other;
    a piston rod guide;
    a piston rod which is movable in the piston rod guide; and
    a valve arranged in a region of one end of the piston rod guide and comprising:
    a valve slide configured to at least partially close at least one flow path of a fluid flowing through the valve;
    an input side;
    an output side;
    pressure impingement areas of the valve slide between the input side and the output side are substantially a same size for an opening pressure and for a closing pressure; and
    a constriction between the input side and the output side via which a pressure difference between opening pressure and closing pressure can be generated,
    wherein the at least one flow path comprises a main flow path fluidically connected as a flow path with an output side of the valve and that can be closed by the valve slide, and
    wherein a thickness of a wall of the valve slide increases at least partially from the output side to a center so that a displacement of the valve slide causes a cross-sectional narrowing of the main flow path.

19. The vibration damper according to claim 1, wherein a displaceable piston is arranged in an inner tube element, the valve is arranged one of at and in the inner tube element, and a center tube element separates a main flow path from a bypass path that are fluidically connected to an interior of the inner tube element.

20. The vibration damper according to claim 9, wherein a damping force generating device is arranged in the main flow path.

* * * * *